Inventor
Albert E. Newton
By his Attorney

United States Patent Office 3,512,224
Patented May 19, 1970

3,512,224
GROMMET FASTENER AND METHOD FOR SETTING SAME
Albert E. Newton, Beverly, Mass., assignor to USM Corporation, Flemington, N.J., a corporation of New Jersey
Filed Apr. 29, 1968, Ser. No. 724,773
Int. Cl. A43c 5/00
U.S. Cl. 24—141  6 Claims

ABSTRACT OF THE DISCLOSURE

A grommet assembly including opposed first and second grommet members, at least the first grommet member having a flange portion and a barrel portion, at least one of said portions being provided with at least one orifice through which adhesive may be forced during the grommet setting operation, or, alternatively, after the grommet has been set. The method of setting the grommet assembly comprises placing the barrel portion of said first grommet member in a hole in sheet material, placing the second grommet member on the opposite side of the sheet material and in a position in alignment with and opposed to the first grommet member, pressing the grommet members into locking engagement with each other and with the sheet material, and, while pressing the grommet members together, injecting adhesive under pressure through the orifice whereby to cause the adhesive to flow between the grommet members to effect a cementitious bond between the members and the sheet matrial.

BACKGROUND OF THE INVENTION

Field of the invention

This invention relates to grommet type fasteners and is directed more particularly to an adhesively secured grommet assembly.

Description of the prior art

Fasteners of the grommet or eyelet type are well known in the art, but generally suffer from a lack of holding power and from a tendency to work loose after extended period of use.

SUMMARY OF THE INVENTION

It is an object of the present invention to provide a fastener of the grommet type which has superior holding characteristics and which does not tend to work loose after extended periods of use under stress.

It is a further object of the invention to provide a method for setting a grommet assembly comprising injecting flowable adhesive into the grommet during the grommet setting operation, or, alternatively, after the grommet is set, whereby to secure the grommet to the material in which it is set.

With the above and other objects in view, as will hereinafter appear, the present invention contemplates as a feature thereof the provision in a grommet type fastener of at least one orifice in the barrel or flange portion thereof for the passage of fluid adhesive therethrough.

In accordance with a further feature of the invention there is provided a method for setting a grommet in sheet material comprising forcing of fluid adhesive into the grommet assembly during the grommet setting operation, or, alternatively, into a set grommet. The adhesive is forced through at least one orifice in the grommet assembly, and thereafter flows around the outside walls of the barrel portion of the grommet assembly and, if the grommet is set in a plurality of layers of material, between the layers of material whereby to join the layers together adhesively and to join the grommet to the material adhesively.

It is to be understood that the present invention is by no means limited to the particular construction herein disclosed and/or shown in the drawings, but also comprises any modifications or equivalents within the scope of the disclosure.

DESCRIPTION OF THE PREFERRED EMBODIMENTS

Figure 1:
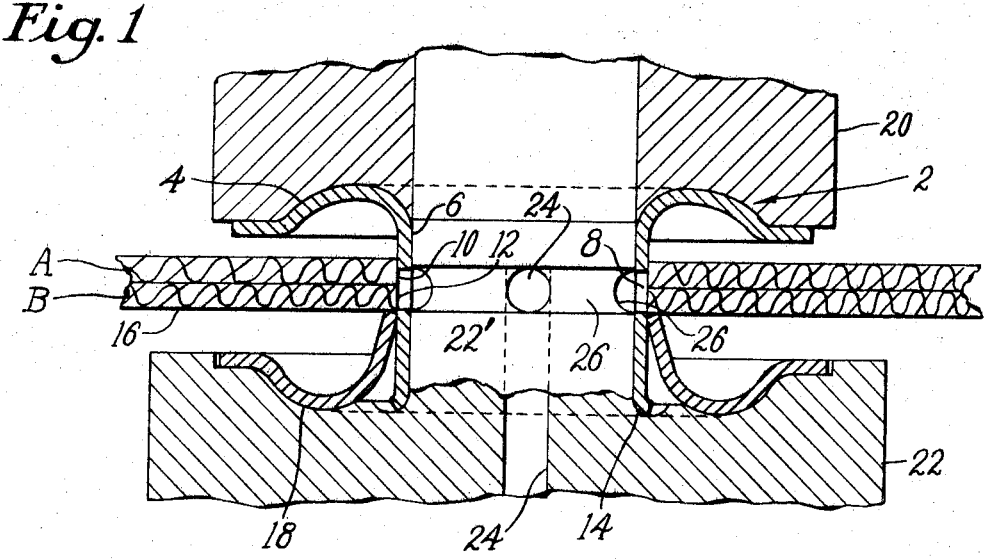
FIG. 1 is an elevational sectional view of one form of grommet assembly illustrative of an embodiment of the invention, the grommet shown in position for setting.

Referring to the drawings, it will be seen that the illustrative device comprises a grommet member 2 having a flange portion 4 and a barrel portion 6. The barrel portion is provided with at least one orifice 8, and preferably a plurality of such orifices.

If, as is shown in the drawings for illustrative purposes, it is desired that the grommet assembly join together two pieces of material A and B, the barrel portion 6 of the grommet member 2 is disposed in aligned holes 10, 12 of the materials A and B, respectively. An end portion 14 of the grommet member 2 protrudes beyond the surface 16 of the layer of material most removed from the flange 4. In setting the grommet, the end portion 14 is rolled or flanged over a second grommet member 18 which receives the barrel portion of the first grommet member and which cooperates with the first grommet member 2 to grip the materials A and B therebetween. In accordance with the present method of grommet setting, the usual grommet setting dies 20, 22 are utilized to press the grommet members 2, 18 together, except that a spindle portion 22' of the lower die 22 is provided with a sprue passage 24 which interconnects an adhesive injection device (not shown) with a groove 26 disposed circumferentially of the spindle portion 22' of the die 22. The spindle accordingly facilitates the injection of fluid adhesive into the interior 28 of the grommet assembly by way of the orifices 8, filling the interior 28 of the grommet assembly. The flowable adhesive engages the materials A and B, as well as the grommet members 2, 18. The adhesive tends to flow around the exterior of the barrel portions to engage substantially the periphery of the barrel portions, as well as the material abutting the barrel portions. Preferably, two or more orifices 8 are utilized to insure proper spreading of the adhesive about the grommet assembly.

It is important that the adhesive be of a relatively non-viscous type so that it will readily flow through the orifices 8 and around the barrel and between the layers of material.

Figure 2:
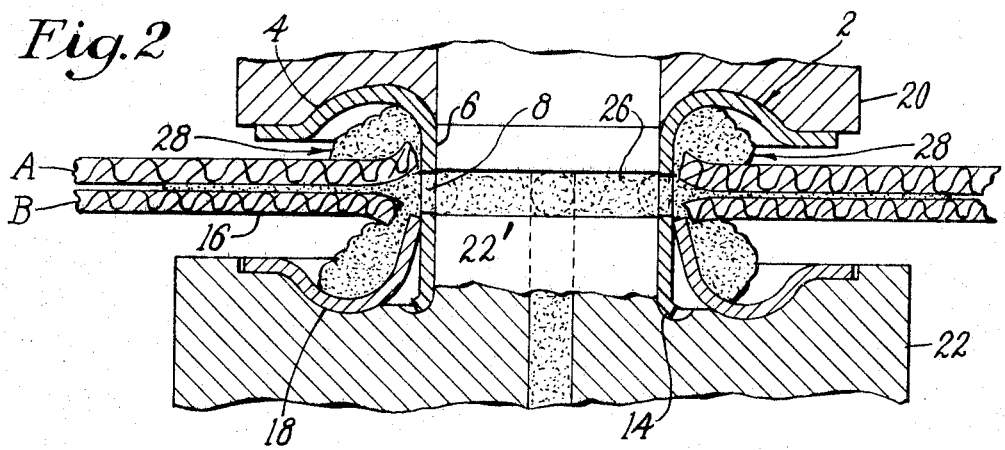
FIG. 2 is similar to FIG. 1, but shows the grommet assembly being set and receiving flowable adhesive.
Figure 3:
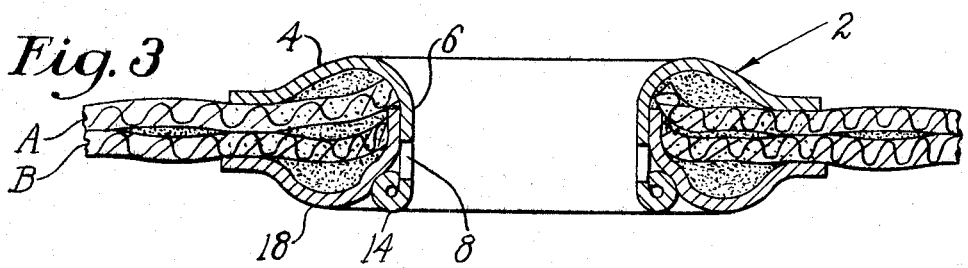
FIG. 3 is similar to FIG. 2, but shows the grommet after completion of the setting operation and after adhesive has been injected therein.

In operation, the grommet assembly is placed and set in sheet material in the usual manner, as shown in FIGS. 1 and 2, but including the additional unique feature of injecting a relatively non-viscous adhesive between the grommet members, as shown in FIG. 2, the adhesive thus injected being adapted to flow through the orifices 8 to engage the radially outer surfaces of the barrel portions of the grommet as well as the material in which the grommet is set.

In the event it is desirable for a particular application to first set the grommet and then inject adhesive thereinto, as for example in making repairs to tents, sails, and like contrivances, the orifices 8 may be provided in the flange portions as well as the barrel portions of the grommet members. Thus, a portable adhesive dispensing hand gun may be used to inject flowable adhesive into the grommet assembly.

Since certain obvious changes may be made in the illustrative grommet assembly without departing from the scope of the invention, it is intended that all matters contained herein be interpreted in an illustrative and not a limiting sense.

Having thus described my invention, what I claim is new and desire to secure by Letters Patent of the United States is:

1. A grommet assembly comprising telescoping first and second grommet members, at least said first grommet member having a barrel portion and a flange portion, at least one of said grommet members being provided with at least one orifice through which adhesive is flowable to the exterior of said one member, whereby to bond said grommet assembly to a material in which the grommet assembly is set.

2. The invention according to claim 1 in which said orifice is disposed in the barrel portion of said first grommet member.

3. A grommet assembly comprising first and second grommet members, said first grommet member having a barrel portion and an annular flange portion disposed radially of said barrel portion, said second grommet member having a flange portion and being adapted to receive said first grommet member barrel portion, said grommet assembly being provided with orifice means for the passage of flowable adhesive therethrough, said first grommet member flange portion and said second grommet member flange portion being adapted to clamp therebetween a material in which the grommet assembly is set, said first and second flange portions defining a chamber for receiving the adhesive from said orifice means.

4. The invention according to claim 3 in which said orifice means comprises at least one orifice disposed in said first grommet member barrel portion.

5. Method of setting a grommet assembly comprising placing a barrel portion of a first grommet member in an opening in sheet material, placing a second grommet member on the opposite side of said sheet material and in alignment with and opposed to said first grommet member, said second grommet member receiving the barrel portion of said first grommet member, pressing the grommet members into locking engagement with each other, and while pressing the grommet members together injecting flowable adhesive under pressure through orifice means in the barrel portion of said first grommet member whereby to cause said adhesive to flow between the grommet members to effect a cementitious bond between the members and the sheet material.

6. Method of setting a grommet assembly comprising placing a barrel portion of a first grommet member in an opening in sheet material, placing a second grommet member on the opposite side of said sheet material and in alignment with and opposed to said first grommet member, said second grommet member receiving the barrel portion of said first grommet member, said first grommet member having a first annular flange portion disposed radially of said barrel portion, said second grommet member having a second annular flange portion, pressing the grommet members together whereby to clamp said material between said first and second flange portions, said flange portions defining a chamber for receiving adhesive, and injecting adhesive into said chamber through orifice means in said assembly to effect a cementitious bond between the members and the sheet material.

References Cited

UNITED STATES PATENTS

| 1,327,033 | 1/1920 | Gookin. | |
|---|---|---|---|
| 3,399,435 | 9/1968 | Ackerman | 24—141 |

FOREIGN PATENTS

| 5,927 | 1896 | Great Britain. |
|---|---|---|

DONALD A. GRIFFIN, Primary Examiner